A. KAHLOW.
HANDLE FOR SUITCASES AND THE LIKE.
APPLICATION FILED SEPT. 16, 1919.
1,403,167. Patented Jan. 10, 1922.
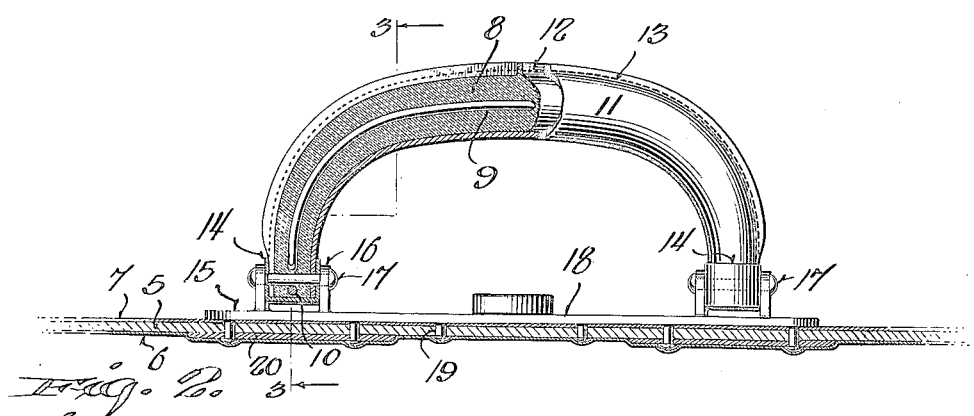
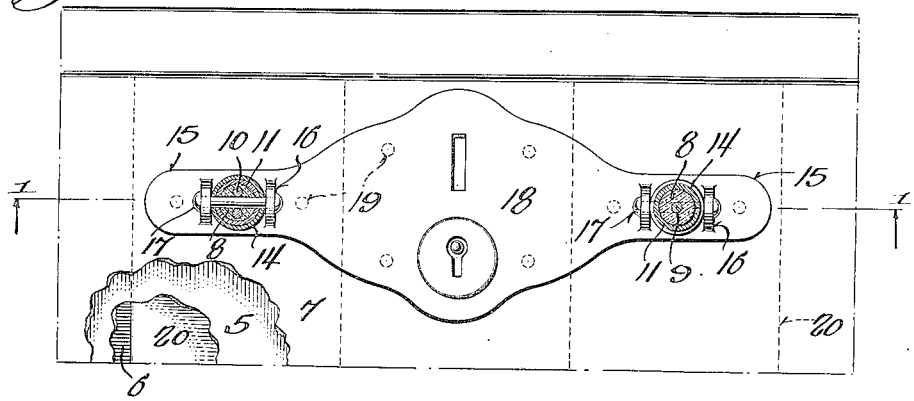
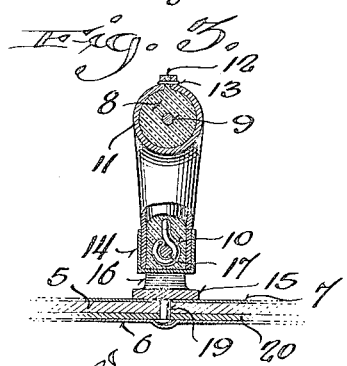
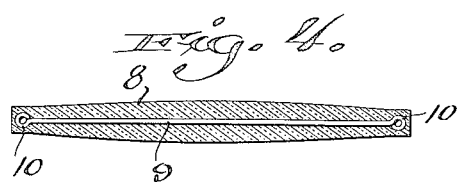
Inventor:
Arthur Kahlow

UNITED STATES PATENT OFFICE.

ARTHUR KAHLOW, OF MILWAUKEE, WISCONSIN.

HANDLE FOR SUITCASES AND THE LIKE.

1,403,167.     Specification of Letters Patent.    Patented Jan. 10, 1922.

Application filed September 16, 1919. Serial No. 324,066.

*To all whom it may concern:*

Be it known that I, ARTHUR KAHLOW, a citizen of the United States, and resident of Milwaukee, in the county of Milwaukee and State of Wisconsin, have invented certain new and useful Improvements in Handles for Suitcases and the like; and I do hereby declare that the following is a full, clear, and exact description thereof.
My invention relates to new and useful improvements in handles for suit-cases, traveling bags or other articles, and more particularly of that type comprising a grip member covered with rubber or other sheathing material, the ends of the grip member being bent and pivoted to the suitcase or other article.

It is in general the object of my invention to improve the durability and increase the convenience of manipulation of handles of this character, and also to facilitate the economy of manufacture of handles possessing such qualities to a maximum extent.

It is more particularly my object to provide a handle having a body member which provides a cushioning action for the hand, yet which possesses sufficient stiffness to retain its general desired contour and to effectively meet the load stresses which would be imparted thereto in use.

It is further my object to provide an improved method for forming such a handle which facilitates the securement of sheathing material to the body member of the handle.

A still further object resides in the provision of an improved means for attaching the handle to the suit-case or other article whereby to distribute the attaching strain to a maximum extent.

With the above and other objects and advantages in view, which will be apparent as the description proceeds, my invention resides in the novel features of construction, combination and arrangement of parts which will be hereinafter more particularly described and defined by the appended claims.

In the accompanying drawings:
Figure 1 is a vertical longitudinal sectional view through the upper portion of a suit-case and through the major portion of a handle member associated therewith and embodying my invention, the plane of this section being indicated by the line 1—1 of Figure 2.

Figure 2 is a plan view of the attaching means for the handle, with the end portions of the handle associated therewith in section.

Figure 3 is a transverse sectional view through the handle on planes indicated by the broken line 3—3 of Figure 1.

Figure 4 is a longitudinal sectional view through the body member of the handle and showing the first step in forming the handle.

Referring now more particularly to the accompanying drawings, 5 designates the board or filler body of the top of a suit-case or similar article, said board being covered by the usual inner and outer sheathings 6 and 7 respectively.

My improved handle comprises an elongated cylindrical body member 8 formed of rubber or other yieldable resilient material and molded on a core wire 9 which extends longitudinally through the body member and has its ends bent to form terminal eyes 10 in the ends of the body member for receiving the pivots of the handle, the body member being slightly taperingly reduced in diameter toward its ends to provide an efficient grip surface. To facilitate the application of a leather or similar sheathing sheet 11 to the body member, said body member and wire are initially formed straight, as shown in Figure 4, and the sheet 11 is bent thereabout, with its edges turned outwardly and engaged against a longitudinal rib 12 formed on the body member. Stitching 13 is then passed through the edges and rib and said edges and rib are subsequently trimmed adjacent the stitching to present a neat appearance. The rib is comparatively thin and of proper color, whereby it is not conspicuous in the finished handle, and it serves to prevent slipping of the sheathing about the body member, such as might otherwise occur. After the sheathing has been applied, the end portions of the handle are bent to their conventional shape in a direction away from the seam of the sheathing, the sheathing material being of such nature as to stretch and otherwise accommodate itself to the change in shape of the body member without detracting from the appearance of the handle.

By applying the sheathing to the body member when said body member is straight, the stitching operation is greatly facilitated 11 and a more economical blank shape of the filler sheet may be provided. The ends of the body member and sheathing are inserted in ferrule caps 14 provided with pivot apertures in alignment with the terminal eyes 10 of the core wire.

It is the usual practice to secure the end of the handle to attachment members which are independently secured to the suit-case or the like. In my improved structure, I provide a pair of attachment portions 15 each provided with a pair of upstanding ears 16 receiving a pivot pin 17 passed through the ferruled ends of the handle and through the terminal eyes 10 of the core wire, and these attachment portions constitute integral end extensions of the usual lock-plate 18 which is secured on the suit-case top under the handle. Rivets 19 extend through the top of the suit-case from the plate 18 and from the attachment sections 15, the rivets of the attachment sections 15 being also preferably passed through metallic reinforcing plates 20 extending transversely across the top of the suit-case and disposed between the board 5 and the inner sheathing or lining 6, this type of reinforcement being shown in patent No. 860,805 granted to me July 23, 1907. Thus, in addition to the usual means of securement for the handle ends, a mutual distribution of stresses transmitted to the suit-case is effected by the integral connections of the lock plate with the attachment sections for the handle, whereby to prevent possible failure of the structure upon the occurrence of abnormal stress.

While I have shown and described a preferred embodiment of my invention, it will be appreciated that various changes and modifications of structure may be employed to meet differing conditions of use and manufacture, without departing in any manner from the spirit of my invention.

What is claimed is:

1. A handle for suit cases and the like comprising an elongated pliable body member, a core wire having an eye at each end, the core with its eyes being embedded in said body member, and a pin extending through each eye and through the surrounding material and adapted to pivotally connect the handle to the article to be carried thereby.

2. A handle for suit cases and the like comprising an elongated pliable body member, a core wire having an eye at each end, the core with its eyes being embedded in said body member, said body member being surrounded by a sheathing and provided with a ferrule at each end, and a pin extending through each eye and through the body material and ferrule, and adapted to pivotally connect the handle to the article to be carried thereby.

3. A handle for suit cases and the like comprising an elongated body member of elastic material, a core wire embedded in said elastic material, and having an eye at each end, the material of the under side of said body member being under compression and the material of the upper side thereof being under tension.

4. A handle for suit cases and the like comprising an elongated body member of flexible rubber, a core wire having an eye at each end, the core with its eyes being embedded in said rubber, the material of the under side of said body member being under compression and the material of the upper side thereof being under tension, said body member being surrounded by a sheathing and provided with a ferrule at each end, and a pin extending through each eye and through the body material and ferrule and adapted to pivotally connect the handle to the article carried thereby.

In testimony that I claim the foregoing I have hereunto set my hand at Milwaukee in the county of Milwaukee and State of Wisconsin.

ARTHUR KAHLOW.